United States Patent
Minowa

(10) Patent No.: US 6,571,721 B1
(45) Date of Patent: Jun. 3, 2003

(54) ASH MELTING APPARATUS

(75) Inventor: Akira Minowa, Tochigi (JP)

(73) Assignee: Hikari Tech Co., Ltd., Tokyo (JP)

(*) Notice: Subject to any disclaimer, the term of this patent is extended or adjusted under 35 U.S.C. 154(b) by 0 days.

(21) Appl. No.: 09/979,399

(22) PCT Filed: Sep. 17, 2001

(86) PCT No.: PCT/JP01/08071

§ 371 (c)(1),
(2), (4) Date: Nov. 19, 2001

(87) PCT Pub. No.: WO02/25172

PCT Pub. Date: Mar. 28, 2002

(30) Foreign Application Priority Data

Sep. 19, 2000 (JP) ......................... 2000-324734

(51) Int. Cl.[7] ............................. F23J 1/00; F27B 14/00; F27B 5/44
(52) U.S. Cl. ................... 110/165 R; 110/235; 432/156
(58) Field of Search ................... 110/226, 262, 110/266, 245, 165 R, 250, 235, 346; 432/156, 157, 3; 219/422; 65/134.7; 373/45, 72, 156

(56) References Cited

U.S. PATENT DOCUMENTS

| 3,599,581 A | * | 8/1971 | Schoppe | 110/8 R |
| 3,805,714 A | * | 4/1974 | Sharpe | 110/8 R |
| 4,291,634 A | * | 9/1981 | Bergsten et al. | 110/235 |
| 4,334,857 A | * | 6/1982 | Smitka et al. | 432/3 |
| 4,436,143 A | * | 3/1984 | Sevastakis | 164/440 |
| 4,831,944 A | * | 5/1989 | Durand et al. | 110/346 |
| 5,120,029 A | * | 6/1992 | Durbin | 266/275 |
| 5,301,620 A | * | 4/1994 | Nagel et al. | 110/346 |
| 5,477,790 A | * | 12/1995 | Foldyna et al. | 110/346 |
| 5,572,938 A | * | 11/1996 | Leger | 110/346 |
| 5,810,907 A | * | 9/1998 | Okada et al. | 75/687 |

FOREIGN PATENT DOCUMENTS

| JP | 05-261358 | 10/1993 |
| JP | 7-280453 | 10/1995 |
| JP | 7-332866 | 12/1995 |
| JP | 08-226622 | 9/1996 |
| JP | 10- 17340 | 1/1998 |
| JP | 10-220964 | 8/1998 |
| JP | 200035284 | 2/2000 |
| JP | 2000 -039267 | 2/2000 |
| JP | 2000 -097425 | 4/2000 |

* cited by examiner

Primary Examiner—Ira S. Lazarus
Assistant Examiner—K. B. Rinehart
(74) Attorney, Agent, or Firm—Richard M. Goldberg

(57) ABSTRACT

The furnace body uses a crucible as the innermost layer thereof to reduce wearing of furnace materials and achieve downsizing of the furnace body; the crucible is made into the form of a cartridge so as to fully facilitate replacement thereof; a mixture of a petroleum gas such as propane and butane and an oxygen gas or air is used mainly as a fuel, which is subjected to complete combustion to ensure complete combustion of the fuel, as well as, sufficient temperature control; and an arrangement is employed for contriving arrangement of the burner, the ash charge port, and other elements so as to improve heat efficiency, thus facilitating temperature control in the furnace, reducing wearing of the furnace body and facilitating repair of the furnace.

9 Claims, 1 Drawing Sheet

ASH MELTING APPARATUS

TECHNICAL FIELD

The present invention relates to an apparatus for melting ash, particularly to an extremely efficient and downsizable apparatus which is directed to detoxifying and reusing ash to be left after incineration of industrial waste, and which melts ash to convert it into the form of granule, block or fiber.

BACKGROUND ART

Today, dioxin, heavy metals, etc. contained in ash to be left as waste after incineration of domestic, industrial and hospital refuse and discarded in the environment are giving rise to serious social problems, and means for treating them have been sought for.

There have recently been disclosed methods as means for treating such ash waste, which carry out melting and solidification of ash to achieve weight reduction and detoxification thereof. For example, Japanese Unexamined Patent Publication No. Hei 05-261358 discloses a method in which melting of ash is carried out by means of arc melting and resistance melting.

The above method involve problems that, while the furnace is heated to a high temperature of 2,000° C. or higher and it is difficult to carry out temperature control, there is substantially no furnace material which can withstand such temperatures, and in order to cope with the high temperatures, the thickness of furnace materials is increased, leading to increase in size of the furnace; and that since the furnace body undergoes wearing heavily and since there is taken no countermeasure for it, the furnace body needs wholesale servicing under long-term interruption of operation of the apparatus in a short cycle, leading to extremely low production efficiency and increase in maintenance cost of equipment.

Meanwhile, for example, Japanese Unexamined Patent Publication Nos. Hei 10-220964, 2000-039267 and 2000-097425 each disclose an ash melting apparatus utilizing a phenomenon of the generally so-called thermit reaction to be induced by heating a mixture of a metal oxide and an aluminum powder to generate a large quantity of heat by oxidation of aluminum. However, the apparatus likewise involves the problems as described above, since it is difficult here again to carry out temperature control, and since the apparatus is frequently heated to a temperature of 2,000° C. or higher.

Meanwhile, Japanese Unexamined Patent Publication No. Hei 8-226622, which is directed to providing an inexpensive and small-sized ash melting apparatus, containing a furnace body having an exhaust port, a mechanism of feeding ash into the furnace body and a burner for burning a heavy oil in the furnace body, discloses a constitution in which the furnace body contains means for supplying a gas which increases susceptibility of a fuel to burn, and the exhaust port is of such a size as will increase the internal pressure of the furnace body.

Since the main purpose of the above method is to use heavy oil as a fuel, use of the fuel having a large number of carbon atoms requires a large quantity of air necessary for achieving complete combustion thereof, and the air cools the furnace to prevent the internal temperature of the furnace from rising to a sufficient level. Therefore, ventilation is regulated to provide an increased pressure in the furnace so as to reduce cooling and to attain the predetermined temperature. However, the insufficient ventilation makes it difficult to maintain well the state of complete combustion, bringing about problems including insufficient temperature, abnormal combustion, noxious gas formation and scattering of ash.

In view of the problems described above, the present invention is directed to attaining easily a target temperature of 1,600 to 1650° C. without increasing the internal temperature of the furnace; to increase durability of the furnace body by reducing wastage thereof due to ease of temperature control and to absence of abnormal temperature rise to 2,000° C. or higher; to further extend the periodical servicing cycle of the furnace by using a less-wearing material in a zone of the innermost layer of the furnace containing a plurality of layers to be brought into contact with a high-temperature molten ash; and to make the furnace body of the innermost layer into a form of cartridge to enable easy replacement thereof, thus reducing out-of-production period for troubleshooting of the furnace body, improving production efficiency by a wide margin and enabling downsizing of the furnace body.

DISCLOSURE OF THE INVENTION

In the present invention, in order to attain the subjects described above, the following measures were taken: wearing of the furnace body is reduced by using a less-wearing crucible as the innermost layer of the furnace body and by facilitating temperature control so as to avoid abnormal temperature rise; the crucible is allowed to have the form of cartridge so as to fully facilitate replacement thereof; an oil having a small number of carbon atoms such as propane and butane is used mainly as a fuel, which is subjected to complete combustion in the presence of a relatively small amount (approximately equivalent amount) of oxygen gas or air supplied at a relatively low flow rate during combustion in well-ventilated normal conditions without regulation of ventilation for pressurization, so as to fully attain necessary temperatures; and means is employed for arranging a burner equipped substantially at the center of a cover which is provided at a side position, an ash charge port, a discharge port located at a lower position, etc. in position so as to improve heat efficiency. By equipping the burner at the center of the cover which is provided at a side position, burning gas dashes into the crucible and does not dash out from the discharge port.

BEST MODE FOR CARRYING OUT THE INVENTION

Figure 1:
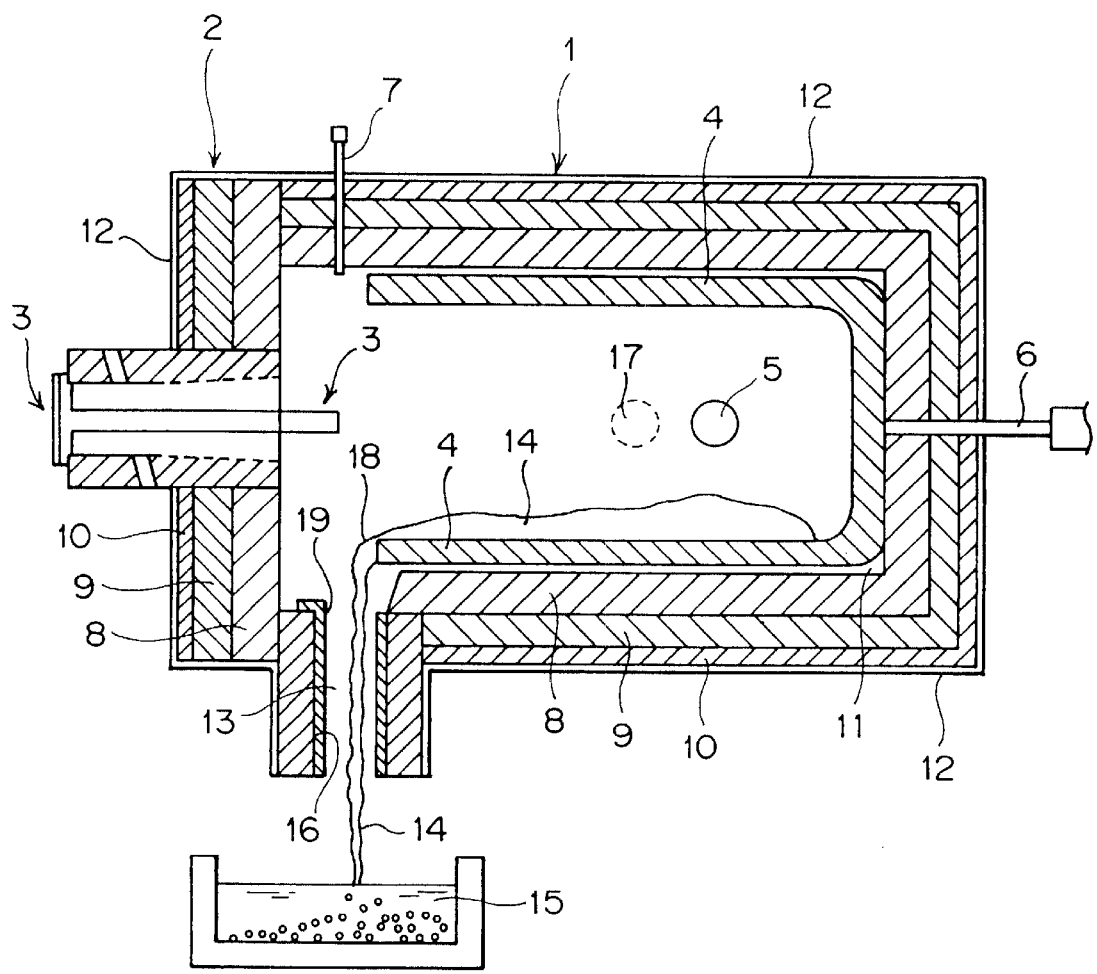
FIG. 1 is a sectional side elevation showing an embodiment of the present invention.

FIG. 1 shows an embodiment in the present invention, which is composed essentially of a furnace body 1, a cover 2, a burner section 3, a crucible 4, an ash charge port 5, a crucible ejector rod 6 and a temperature sensor 7.

While the furnace body 1 desirably has a columnar appearance, it may have an appearance of a polygonal prism such as a quadratic prism. The furnace wall has a six-layer structure having the removable crucible 4 as the innermost layer, a fluidized sand bed 11, a first refractory layer 8, a second refractory layer 9, a third refractory layer 10 and an iron housing 12 arranged in this order. The furnace body 1 has the ash charge port 5 defined on a lateral side around the center, the crucible ejector rod 6 located in the right wall, a discharge port 13 located at a lower left position for discharging a molten ash 14 and for ventilation, and the temperature sensor 7 at an upper left position to secure such a falling position 18 in the removable crucible 4 so that the molten ash 14 can fall without being brought into contact with a wall surface 16 of the discharge port 13. Here, the location of the ash charge port 5 is not limited to the position described above but may be located, for example, in the right wall or top.

As the removable crucible 4, for example, a refractory graphite-silicon carbide crucible (C: 30 to 55%; SiC: 30 to 50%) commercially manufactured by Nippon Crucible, by molding a refractory material to have predetermined dimensions and baking the resulting molded product. The thus obtained crucible wears less than conventional refractory bricks and castable refractories. As the first refractory layer 8 and the second refractory layer 9, there can be used castable refractories, crucibles or refractory bricks. A material having higher heat resistance is used for first refractory layer 8 rather than for the second refractory layer 9. A board or a heat-insulating castable can be used for the third refractory layer 10.

The cover 2 is composed essentially of a first refractory layer 8, a second refractory layer 9, a third refractory layer 10 and an iron housing 12 like the furnace body 1 and has the burner 3 at the center. The cover 2 is designed to be opened and closed easily with hinges attached to one side thereof and to be openably fastened intimately to the furnace body 1 with screws or the like, as shown in FIG. 1.

The burner 3 to be employed in the present invention is desirably of such a type that uses a petroleum gas such as propane gas and butane gas as a fuel which is subjected to complete combustion with the aid of a relatively small amount (approximately equivalent amount) of oxygen gas or air. Since the exhaust gas formed by combustion of the gas is relatively clean, and since the gases are injected from the burner 3 under a relatively low pressure, scattering of ash is reduced, so that the amount of ash contained in the exhaust gas can be reduced. In addition, ash is designed to be charged into the furnace around the center of the crucible 4, i.e. the highest temperature zone, to which flames from the burner 3 direct. Therefore, the ash starts to melt immediately after charging. As described above, since the furnace has a rational constitution to show excellent heat efficiency, there can be used a city gas containing inexpensive natural gasses or fossil fuels such as kerosene.

In operating the furnace of the present invention shown in FIG. 1, the furnace is set as shown in FIG. 1, and then a mixture of propane gas and an approximately equivalent amount of oxygen gas is ignited immediately after it is injected from the burner 3. If ash is charged through the ash charge port 5 after confirmation of the state where the internal furnace temperature being controlled between 1,600 and 1,650° C. by the temperature sensor 7, scattering of ash can be reduced due to the low flame injecting rate, and the ash starts to melt speedily since the high-temperature state can be obtained easily. The molten ash 14 forms a pasty liquid, which falls, through the discharge port 13 into water 15 to be granulated therein. It should be noted here that if the pasty liquid is taken into the atmosphere and is cooled slowly, it forms a block. Meanwhile, the block can be drawn into fibers that can be utilized effectively as aggregate or reinforcing material for concrete.

In the present invention, when the crucible 4 is worn out after a long-term use and needs replacement with new one, the furnace is cooled, and then the cover 2 is opened to around 180°. In this state, the furnace body 1 is pivoted on a boss 17 formed on the sidewall thereof to allow the cover 2 to face downward. The crucible 4 is then pushed with the crucible ejector rod 6 under hydraulic driving or manual screw driving, the crucible 4 can be taken out from the furnace easily under the action of the fluidized sand bed 11. Thus, replacement of crucible can be carried out extremely easily.

Further, the ash melting apparatus in the present invention is designed to be able to pivot on the boss 17 of the furnace body 1 and to be locked, so that the inclination of the furnace body 1 can be set at a desired angle to enable adjustment of the exit velocity of the molten ash 14. In addition, it is desirable to apply to the wall surface 16 of the discharge port 13 a cylindrical adhesion preventing material 19 of the same composition as the crucible so as to prevent deposition and solidification of the molten ash on the wall surface 16.

INDUSTRIAL APPLICABILITY

The ash melting apparatus according to the present invention has the constitution as described above and exhibits the following effects:

(1) The use of a refractory crucible as the innermost layer of the furnace body can reduce wearing of the furnace material in normal operations at a temperature of 1,600 to 1,650° C.;

(2) The crucible serving as the innermost layer of the furnace body is made into the form of cartridge, and also the furnace body is originally designed to have a structure facilitating removing of the crucible, making the operation of replacing the worn-out crucible with new one extremely easy;

(3) the adoption of the system for achieving complete combustion of propane gas having a small number of carbon atoms used mainly as a fuel in the presence of an approximately equivalent amount of oxygen gas or the like can afford easily sufficient temperature levels necessary for melting ash under full ventilation without pressurization, while the ease of temperature control can reduce notably wearing of the furnace due to abnormal temperature rise;

(4) the use of the fuel described above forms a relatively clean exhaust gas, and the gases are supplied at a relatively low flow rate to reduce scattering of ash, facilitating treatment of the exhaust gas;

(5) since the furnace is designed to have a constitution in which flames are injected under low pressure toward the center of the crucible, the furnace shows excellent heat efficiency, readily provides high temperature levels and can reduce the running cost; and (6) since wearing of the furnace is reduced as described above, intervals of the servicing cycle of the furnace can be extended notably; and the thickness of the furnace wall need not be increased so much, so that the furnace can be downsized, in addition, durability of the furnace can totally be improved significantly.

What is claimed is:

1. An ash melting apparatus comprising:

a furnace body having a discharge port located at a lower position and an ash charge port, a cover provided at a side position and having a burner substantially at a center thereof, the furnace body including a replaceable crucible as an innermost layer, the crucible having an opening facing toward the cover, and a fluidized sand bed between the crucible and a first refractory layer in the furnace body.

2. An ash melting apparatus comprising:

a furnace body having a discharge port located at a lower position and an ash charge port, a cover provided at a side position and having a burner substantially at a center thereof, the furnace body including a replaceable crucible as an innermost layer, the crucible having an opening facing toward the cover, and a crucible ejector rod for ejecting the crucible of the furnace body by abutting the crucible ejector rod against a side face of the crucible.

3. The ash melting apparatus according to claim 2, wherein the burner is positioned so as to direct a flame toward a cavity of the crucible.

4. The ash melting apparatus according to claim 2, wherein the burner uses a petroleum gas as a fuel, which is combined with an oxygen gas.

5. The ash melting apparatus according to claim 4, wherein the oxygen gas is air.

6. The ash melting apparatus according to claim 4, wherein the petroleum gas is selected from the group consisting of propane gas and butane gas.

7. The ash melting apparatus according to claim 2, wherein the ash charge port is located around a center of a side face of the furnace body.

8. An ash melting apparatus comprising:

a furnace body having a discharge port located at a lower position and an ash charge port, a cover provided at a side position and having a burner substantially at a center thereof, the furnace body including a replaceable crucible as an innermost layer, the crucible having an opening facing toward the cover, and a falling position of molten ash from the furnace body is positioned such that the molten ash is not brought into contact with a wall surface of the discharge port.

9. An ash melting apparatus comprising:

a furnace body having a discharge port located at a lower position and an ash charge port, a cover provided at a side position and having a burner substantially at a center thereof, the furnace body including a replaceable crucible as an innermost layer, the crucible having an opening facing toward the cover, and the discharge port is provided on a wall surface with an adhesion preventive material.

\* \* \* \* \*